(12) United States Patent
Lin

(10) Patent No.: US 8,259,784 B2
(45) Date of Patent: Sep. 4, 2012

(54) HIGH-SPEED CONTINUOUS-TIME FEEDBACK EQUALIZER FOR SERIAL LINK RECEIVER

(75) Inventor: Chia-Liang Lin, Fremont, CA (US)

(73) Assignee: Realtek Semiconductor Corp., Science Park, HsinChu (TW)

( * ) Notice: Subject to any disclaimer, the term of this patent is extended or adjusted under 35 U.S.C. 154(b) by 397 days.

(21) Appl. No.: 12/732,217

(22) Filed: Mar. 26, 2010

(65) Prior Publication Data

US 2011/0235695 A1    Sep. 29, 2011

(51) Int. Cl.
    *H03H 7/30*    (2006.01)
(52) U.S. Cl. ........................... 375/229; 375/346
(58) Field of Classification Search .......... 375/229–233, 375/294, 376, 345, 327, 346
    See application file for complete search history.

(56) References Cited

U.S. PATENT DOCUMENTS

| | | | |
|---|---|---|---|
| 7,433,401 B1* | 10/2008 | Roo | 375/233 |
| 7,782,935 B1* | 8/2010 | Wong et al. | 375/233 |
| 2005/0135470 A1* | 6/2005 | Momtaz | 375/233 |
| 2005/0135471 A1* | 6/2005 | Tonietto et al. | 375/233 |

* cited by examiner

*Primary Examiner* — Emmanuel Bayard
(74) *Attorney, Agent, or Firm* — Winston Hsu; Scott Margo

(57) ABSTRACT

An apparatus is disclosed, the apparatus comprising: a broad-band continuous-time adjustable weight summing cell for summing an input signal and a feedback signal into an intermediate signal in accordance with a weight factor for the feedback signal; a broad-band continuous-time delay cell for receiving the intermediate signal and outputting the feedback signal; a broad-band variable gain amplifier for amplifying the feedback signal into an output signal in accordance with a gain factor; and an adaptation circuit for adjusting the weight and the gain factor in accordance with the output signal and a timing defined by a clock signal so as to minimize an interference form a previous data to a present data embedded in the output signal.

19 Claims, 1 Drawing Sheet

HIGH-SPEED CONTINUOUS-TIME FEEDBACK EQUALIZER FOR SERIAL LINK RECEIVER

FIELD OF TECHNOLOGY

This disclosure relates to equalizer.

BACKGROUND

A serial link communication system comprises a transmitter, a receiver, and a communication channel. The transmitter launches a first signal unto the communication channel; the first signal is binary, i.e. it comprises a sequence of non-return-to-zero pulses, wherein a pulse of a first level carries a logical "1" data and a pulse of a second level carries a logical "0" data. After propagating through the communication channel, the first signal evolves into a second signal. The receiver receives the second signal and seeks to process the second signal so as to retrieve the data embedded in the first signal. If the communication channel is free of dispersion, the second signal will be substantially similar to the first signal. In this case, the difference between the first signal and the second signal is merely a delay and a scaling factor, both of which can be easily handled by the receiver using various techniques of timing synchronization and automatic gain control that are well known in prior art. In reality, however, the communication channel is usually dispersive, and consequently the second signal is a distorted version of the first signal (besides a possible delay and a possible scaling factor). Decision feedback equalizers are widely used for compensating the distortion caused by the communication channel. A decision feedback equalizer seeks to remove the interference to a succeeding data caused by a present data. However, it is very difficult to design a high-speed decision feedback equalizer due to the timing constraint that one has to detect the present data and remove the interference to the succeeding data within one unit interval.

What is needed is a method and apparatus for high-speed feedback equalizer.

DETAILED DESCRIPTION

The following detailed description refers to the accompanying drawings which show, by way of illustration, various embodiments in which the invention may be practiced. These embodiments are described in sufficient detail to enable those skilled in the art to practice these and other embodiments. The various embodiments are not necessarily mutually exclusive, as some embodiments can be combined with one or more other embodiments to form new embodiments. The following detailed description is, therefore, not to be taken in a limiting sense.

In an embodiment, an apparatus is disclosed, the apparatus comprising: a broad-band continuous-time adjustable weight summing cell for summing an input signal and a feedback signal into an intermediate signal in accordance with a weight factor for the feedback signal; a broad-band continuous-time delay cell for receiving the intermediate signal and outputting the feedback signal; a broad-band variable gain amplifier for amplifying the feedback signal into an output signal in accordance with a gain factor; and an adaptation circuit for adjusting the weight and the gain factor in accordance with the output signal and a timing defined by a clock signal so as to minimize an interference form a previous data to a present data embedded in the output signal.

In an embodiment a method is disclosed, the method comprising: summing an input signal and a feedback signal into an intermediate signal in accordance with a weight factor for the feedback signal using a broad-band continuous-time adjustable weight summing cell; delaying the intermediate signal into a feedback signal using a broad-band continuous-time delay cell; amplifying the feedback signal into an output signal in accordance with a gain factor using a broad-band variable gain amplifier; and adjusting the weight and the gain factor with an adaptation circuit in accordance with the output signal and a timing defined by a clock signal so as to minimize an interference form a previous data to a present data embedded in the output signal.

Figure 1A:
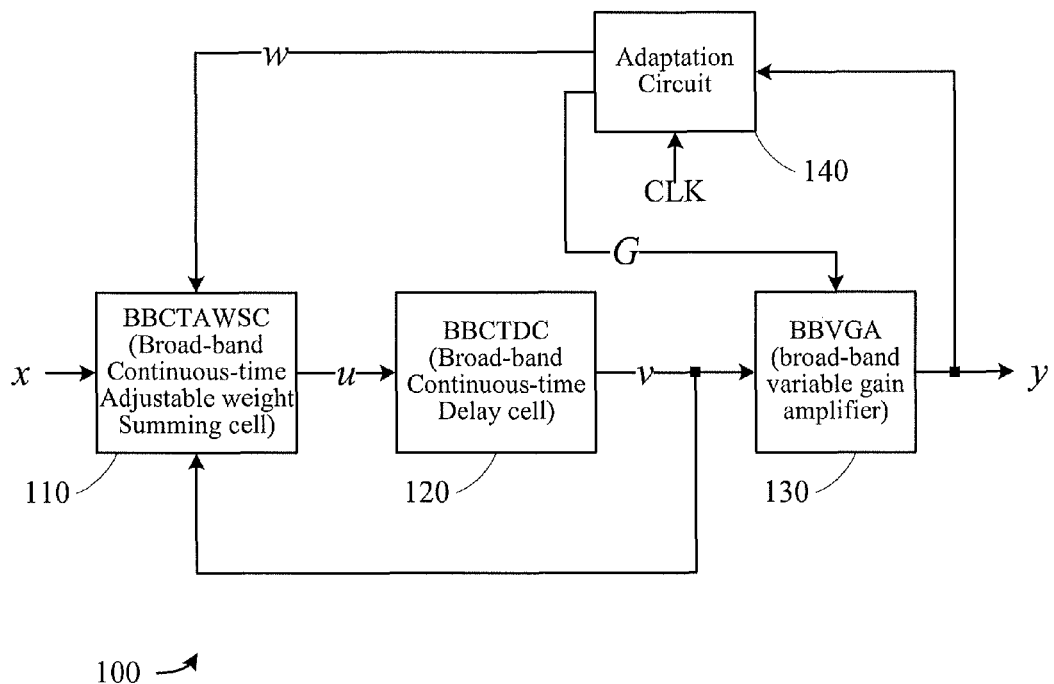
FIG. 1A shows a functional block diagram of a continuous-time feedback equalizer in accordance with the present invention.
Figure 1B:
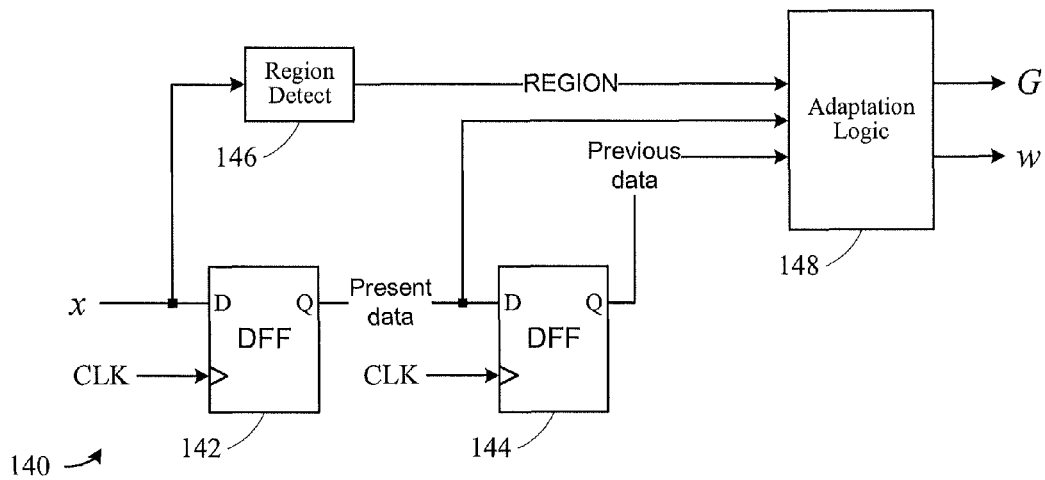
FIG. 1B shows a functional block diagram of a adaptation circuit.

FIG. 1A shows a functional block diagram of a high-speed continuous-time feedback equalizer 100 in accordance with the present invention. Equalizer 100 comprises: a BBCTAWSC (broad-band continuous-time adjustable weight summing cell) 110, a BBCTDC (broad-band continuous-time delay cell) 120, a BBVGA (broad-band variable gain amplifier) 130, and an adaptation circuit 140. BBCTAWSC 110 receives an input signal x (from a serial-link communication channel, e.g. a cable or a transmission line) and a feedback signal v and performs a weighted summing of x and v with a weight factor w control by the adaptation circuit 140, resulting in an intermediate signal u. BBCTDC 120 receives the intermediate signal u and outputs the feedback signal v, whose waveform is very close to the intermediate signal u except for a delay and a scaling factor. BBVGA amplifies the feedback signal v with a gain factor G controlled by the adaptation circuit 140, resulting in an output signal y. The adaptation circuit 140 adjusts the weight factor w and the gain factor G based on the output signal y in accordance with a timing defined by a clock signal CLK. In an embodiment depicted in FIG. 1B, the adaptation circuit 140 comprises: a first sampling device embodied by a first DFF (Data flip-flop) 142 for sampling the output signal y at an edge of the clock signal CLK for generating the present data; a second sampling device embodied by a second DFF (Data flip-flop) 144 for sampling the present sampling at an edge of the clock signal CLK for generating the previous data; a region detect circuit 146 for detecting a region of the output signal y; and an adaptation logic 148 for adapting the weight factor w and the gain factor G based on the region of the output signal y, the present data, and the previous data. The principle of the present invention is described in the following paragraphs.

The channel introduces a distortion to the input signal x. Due to the distortion, a present data causes an interference to a succeeding data. BBCTDC 120 delays the intermediate signal u to generate the feedback signal v. The input signal x comprises contribution mainly from a present data, but also partly from a legacy from a previous data. On the other hand, v mimics a legacy from a previous data (due to the delay of the combination of BBCTAWSC 110 and BBCTDC 120). If the legacy is properly weighted and subtracted from the input signal x (by BBCTAWSC 110), the interference from the previous data can be effectively removed.

The adaptation circuit 140 adjusts the weight factor w and the gain factor G based on the output signal y in accordance with a timing defined by a clock signal CLK. The clock signal CLK is provided from a clock-data recovery circuit (CDR) not shown in the figure but widely known to those of ordinary skill in the art and thus not described in detail here. The clock signal CLK is established by the CDR circuit so that a rising edge of the clock signal CLK is approximately aligned with a center of a current data bit. The adaptation circuit 140 seeks to optimize the weight factor w and the gain factor G so that the output signal y is either of a first level when the current data bit is logical "1" or a second level when the current data is logical "0". Region detect circuit 146 determines which region the output signal y belongs to, with respect to the first level, the second level, and the average of the first level and the second level. In an embodiment, the output signal REGION of the region detect circuit is generated in accordance with the table below:

| Scenario | REGION |
| --- | --- |
| y is above the first level | I |
| y is below the first level but above the average of the first level and the second level | II |
| y is above the second level but below the average of the first level and the second level | III |
| y is below the second level | IV |

REGION I/II suggests that the present data is logical "1" but its level is higher/lower than the first level; in this case, the adaptation logic 148 needs to decrease/increase the gain factor G. Likewise, REGION III/IV suggests that the present data bit is logical "0" but its level is higher/lower than the second level; in this case, the adaptation logic 148 needs to increase/decrease the gain factor G.

REGION I suggests that the present data is logical "1" but its level is distorted to be higher than the first level due to a legacy caused by the previous data; in this case, the feedback weight factor for the feedback signal v needs to be decreased/increased if the previous data is logical "1," but needs to be increased/decreased if the previous data is logical "0." REGION II suggests that the present data is logical "1" but its level is distorted to be lower than the first level due to a legacy caused by the previous data; in this case, the feedback weight factor for the feedback signal v needs to be increased/decreased if the previous data is logical "1," but needs to be decreased/increased if the previous data is logical "0." REGION III suggests that the present data is logical "0" but its level is distorted to be higher than the second level due to a legacy caused by the previous data; in this case, the feedback weight factor for the feedback signal v needs to be decreased/increased if the previous data is logical "1," but needs to be increased/decreased if the previous data is logical "0." REGION IV suggests that the present data is logical "0" but its level is distorted to be lower than the second level due to a legacy caused by the previous data; in this case, the feedback weight factor for the feedback signal v needs to be increased/decreased if the previous data is logical "1," but needs to be decreased/increased if the previous data is logical "0." In this manner, the adaptation logic 148 adjusts the gain G and the weight w in accordance with the REGION for the output signal v and the value of the previous data so that when the output signal y is equalized into the first/second level when the present data is logical "1"/"0".

Note that to ensure that the feedback signal v mimics a legacy from the previous data, the combined delay of the two circuits BBCTAWSC 110 and BBCTDC 120 is preferably comparable to the unit interval of the data. If that condition fails, the adaptation may not function optimally, although it might still help to equalize the input signal to some limited extent.

Note that "broad-band" is defined as follows: a circuit is said to be broad-band if a gain and a group delay of the circuit remain approximately constant from DC to the Nyquist frequency with respect to the data rate of the serial-link of concern. For instance, if the serial link speed is 10 Gb/s, then the Nyquist frequency is 5 GHz, and a broad-band circuit for that serial link needs to have a approximately constant gain and delay for signals from DG to 5 GHz.

For embodiments of BBCTAWSC 110, BBCTDC 120, and BBVGA 130, one may refer to two related applications: U.S. application Ser. No. 12/434,690, filed on May 4, 2009 and entitled "Broadband active delay line" and "U.S. application Ser. No. 12/421,647, filed on Apr. 10, 2009 and entitled "High-Speed Continuous-Time FIR filter", these contents of which are incorporated here as reference. The gain of an amplifier can be adjusted by tuning a bias current of that amplifier. The weight of an input branch of a summing cell can be adjusted by tuning a bias current for that input branch. Those of ordinary skills in the art can freely design circuits that achieve broad-band performance at their discretion.

Although specific embodiments have been illustrated and described herein, it will be appreciated by those of ordinary skill in the art that any arrangement that is calculated to achieve the same purpose may be substituted for the specific embodiments shown. This application is intended to cover adaptations and variations of the embodiments discussed herein. Various embodiments use permutations and/or combinations of embodiments described herein. It is to be understood that the above description is intended to be illustrative, and not restrictive, and that the phraseology or terminology employed herein is for the purpose of description.

What is claimed is:

1. An apparatus comprising:
    a broad-band continuous-time adjustable weight summing cell for summing an input signal and a feedback signal into an intermediate signal in accordance with a weight factor for the feedback signal;
    a broad-band continuous-time delay cell for receiving the intermediate signal and outputting the feedback signal;
    a broad-band variable gain amplifier for amplifying the feedback signal into an output signal in accordance with a gain factor; and
    an adaptation circuit for adjusting the weight and the gain factor in accordance with the output signal and a timing defined by a clock signal so as to reduce an interference form a previous data to a present data embedded in the output signal.

2. The apparatus of claim 1, wherein the weight and the gain factor are adjusted so that the output signal is equalized to a first level when the present data is logical 1, and to a second level when the present data is logical 0.

3. The apparatus of claim 1, wherein the adaptation circuit comprises a region detection circuit for determining a region of the output signal by comparing the output signal with a first level, a second level, and an average of the first level and the second level.

4. The apparatus of claim 3, wherein the adaptation circuit adjusts the gain based on the region of the output signal.

5. The apparatus of claim 3, wherein the adaptation circuit adjusts the weight based on the region of the output signal and a value of the previous data.

6. The apparatus of claim 5, wherein the adaptation circuit increases the gain factor under one of the following two scenarios: the output signal is above the average of the first level and the second level but under the first level; and the output signal is below the average of the first level and the second level but above the second level.

7. The apparatus of claim 6, wherein the adaptation circuit decreases the gain factor under one of the following two scenarios: the output signal is above the first level; and the output signal is below the second level.

8. The apparatus of claim 7, wherein the adaptation circuit increases the weight factor under one of the following four scenarios: the output signal is above the first level and the previous data is logical 0; the output signal is above the average of the first level and the second level but below the first level and the previous data is logical 1; the output signal is below the second level and the previous data is logical 1; the output signal is below the average of the first level and the second level but above the second level and the previous data is logical 0.

9. The apparatus of claim 8, wherein the adaptation circuit decreases the weight factor under one of the following four scenarios: the output signal is above the first level and the previous data is logical 1; the output signal is above the average of the first level and the second level but below the first level and the previous data is logical 0; the output signal is below the second level and the previous data is logical 0; the output signal is below the average of the first level and the second level but above the second level and the previous data is logical 1.

10. The apparatus of claim 4, wherein the gain factor controls a bias of the broad-band variable gain amplifier, and the weight factor controls a bias the of broad-band continuous-time adjustable weight summing cell.

11. A method comprising:
    summing an input signal and a feedback signal into an intermediate signal in accordance with a weight factor for the feedback signal using a broad-band continuous-time adjustable weight summing cell;
    delaying the intermediate signal into a feedback signal using a broad-band continuous-time delay cell;
    amplifying the feedback signal into an output signal in accordance with a gain factor a broad-band variable gain amplifier; and
    adjusting the weight and the gain factor with an adaptation circuit in accordance with the output signal and a timing defined by a clock signal so as to minimize an interference form a previous data to a present data embedded in the output signal.

12. The method of claim 11, wherein the weight and the gain factor are adjusted so that the output signal is equalized to a first level when the present data is logical 1, and to a second level when the present data is logical 0.

13. The method of claim 11, wherein the adaptation circuit comprises a region detection circuit for determining a region of the output signal by comparing the output signal with a first level, a second level, and an average of the first level and the second level.

14. The method of claim 13, wherein the adaptation circuit adjusts the gain based on the region of the output signal.

15. The method of claim 13, wherein the adaptation circuit adjusts the weight based on the region of the output signal and a value of the previous data.

16. The method of claim 14, wherein the gain factor controls a bias of the broad-band variable gain amplifier, and the weight factor controls a bias the of broad-band continuous-time adjustable weight summing cell.

17. An apparatus comprising:
    a continuous-time adjustable weight summing cell for summing an input signal and a feedback signal into an intermediate signal in accordance with a weight factor for the feedback signal;
    a continuous-time delay cell for receiving the intermediate signal and outputting the feedback signal;
    a variable gain amplifier for amplifying the feedback signal into an output signal in accordance with a gain factor; and
    an adaptation circuit comprising:
        a region detection circuit for determining a region of the output signal by comparing the output signal with the first level, the second level, and an average of the first level and the second level;
    wherein the adaptation circuit adjusts the weight and the gain factor in accordance with the region of the output signal and a timing defined by a clock signal so as to reduce an interference form a previous data to a present data embedded in the output signal.

18. The apparatus of claim 17, wherein the adaptation circuit adjusts the gain and the weight based on the region of the output signal.

19. The apparatus of claim 17, wherein the adaptation circuit adjusts the weight based on the region of the output signal and a value of the previous data.

* * * * *